Jan. 9, 1968  K. WEINMANN  3,362,553
CARRIAGE FOR TRAILERS AND THE LIKE
Filed June 23, 1965  4 Sheets-Sheet 1

INVENTOR
KARL WEINMANN
BY
Michael J. Striker
ATTORNEY

Jan. 9, 1968 K. WEINMANN 3,362,553
CARRIAGE FOR TRAILERS AND THE LIKE
Filed June 23, 1965 4 Sheets-Sheet 2

INVENTOR
KARL WEINMANN
BY
Michael J. Striker
ATTORNEY

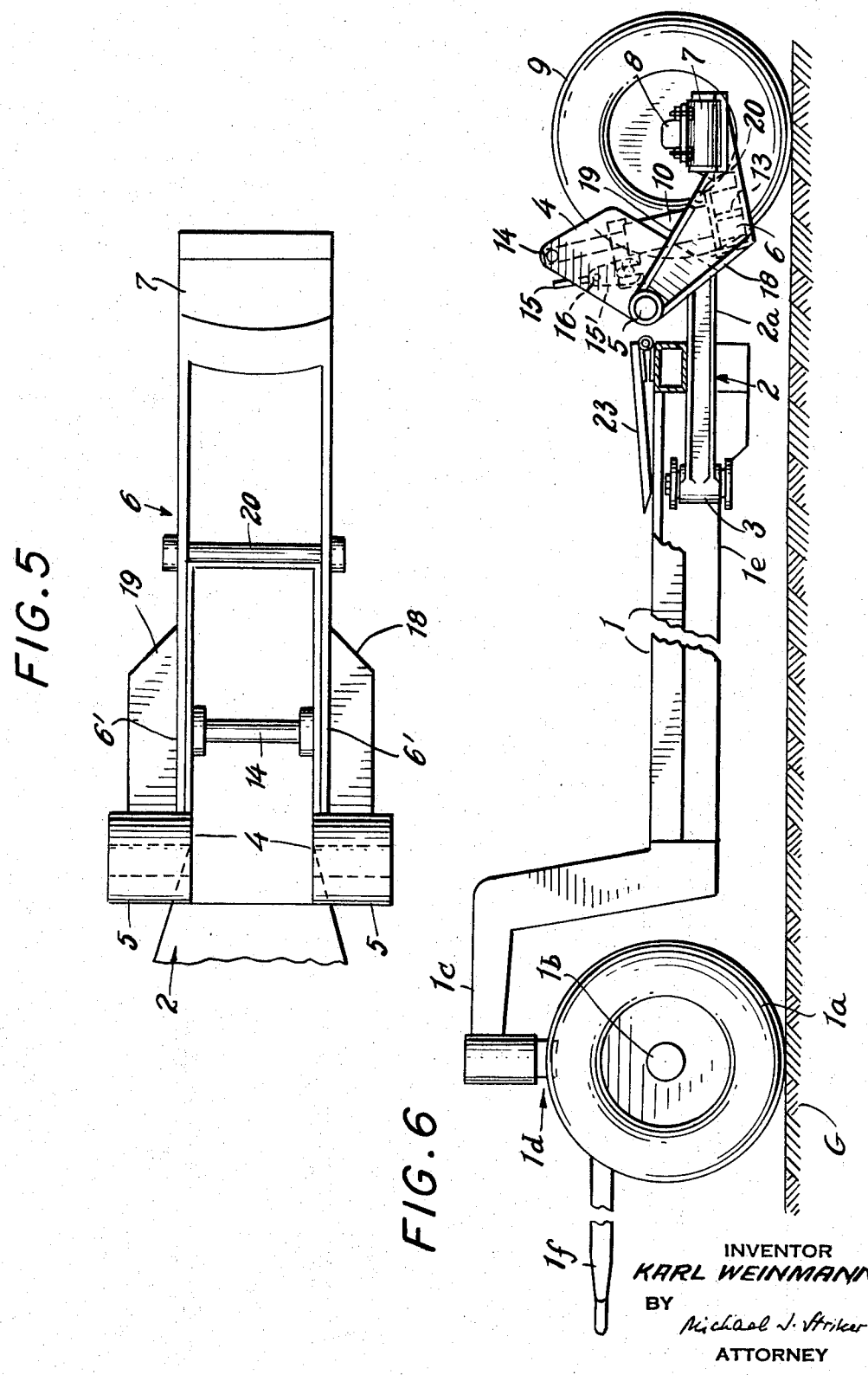

United States Patent Office 3,362,553
Patented Jan. 9, 1968

3,362,553
CARRIAGE FOR TRAILERS AND THE LIKE
Karl Weinmann, 13 Schutt, 6975 Konigshofen,
Baden, Germany
Filed June 23, 1965, Ser. No. 470,315
10 Claims. (Cl. 214—505)

The present invention relates to trailers in general, and more particularly to improved carriages for the wheels on certain types of trailers wherein one end of the chassis is movable to an inclined position in order to facilitate loading or unloading of cargo. Still more particularly, the invention relates to carriages which are especially suited to mount the wheels at the rear ends of low-bed trailers.

In many conventional trailers, the carriages for the rear wheels must be completely detached from the chassis if the rear end of the bed is to descend toward or into actual contact with the ground. Such dismantling and subsequent reattachment of carriages requires much time and effort and can be accomplished only if the trailer is provided with jacks or other lifting devices which allow for gradual lowering or lifting of the bed.

Accordingly, it is an important object of the present invention to provide an improved carirage which may be utilized for supporting one or more wheels on a trailer and which is constructed and assembled in such a way that it may allow gradual and safe raising or lowering of one end of the trailer without resorting to costly, bulky and time-consuming jacks or analogous lifting devices.

Another object of the invention is to provide a carriage of the just outlined characteristics which may be moved out of the way when the trailer is being loaded or unloaded but may remain connected with the chassis at all times.

A further object of the invention is to provide improved connections between the carriages at one or both ends of a trailer and the chassis, and to construct the connections in such a way that they remain fully concealed and protected at all times.

Still another object of the invention is to provide a trailer which is equipped with at least two carriages of the above outlined characteristics.

A concomitant object of the invention is to provide a trailer whose chassis may be moved into actual contact with the ground and wherein such movements of the chassis may be accomplished without resort to heavy-duty jacks or the like.

A further object of the invention is to provide safety devices in the form of locks, couplings and the like for holding the carriages and their parts in operative position so as to prevent uncontrolled lowering of the chassis.

An additional object of the invention is to provide a trailer whose chassis may be lowered or raised by a single person, with little physical effort and within exceptionally short periods of time without resorting to complicated tools or similar costly accessories.

Another object of the instant invention is to provide an improved carriage of the previously outlined characteristics which may be used with advantage in many types of trailers including full trailers, semitrailers, trailers with single or dual wheels, heavy-duty or lightweight trailers, reversible trailers and many others.

With the above objects in view, one feature of the present invention resides in the provision of a trailer, for example, a nonreversible low-bed full trailer for transportation of automobiles or the like, whose chassis comprises a rear portion which is movable between a ground-contacting position to facilitate loading or unloading of cargo and a raised position in which the trailer is ready to be entrained by a truck or another towing vehicle. In accordance with the invention, the trailer further comprises two carriages each including an arm which is articulately connected with the rear portion of the chassis so that it may swivel about a substantially vertical axis but remains spaced from the ground in either position of the rear portion, a link supporting a single rotary wheel or a dual wheel, and pivot means articulately connecting the link with the respective arm so that the link is pivotable about a substantially horizontal axis between a first position in which the respective wheel contacts the ground to thereby raise the rear portion of the chassis and a second position in which the respective wheel is raised above the ground to thereby lower the rear portion of the chassis onto the ground. Each carriage further comprises an actuating device, preferably a double-acting hydraulic or pneumatic cylinder, which serves to move the links with reference to the corresponding arms, and each arm is movable between an operative position in which the respective wheel is located at the rear of the trailer (i.e., the rear portion of the chassis is then located intermediate the rear wheel and the front portion of the chassis) and an inoperative position in which the rear wheel is laterally adjacent to one side of the rear portion of the chassis so that the rear end of the chassis is unobstructed and the cargo may be loaded or unloaded by moving along a suitable ramp which may be permanently or detachably secured to the rear portion.

The novel features which are considered as characteristic of the invention are set forth in particular in the appended claims. The improved carriage itself, however, both as to its construction and the mode of manipulating the same, together with additional features and advantages thereof, will be best understood upon perusal of the following detailed description of certain specific embodiments with reference to the accompanying drawings, in which:

FIG. 5 is an enlarged fragmentary top plan view of the carriage with the cylinder and wheels omitted;

FIG. 6 is a side elevational view of a low-bed trailer which embodies two carriages of the type shown in FIGS. 1 to 5, one of the carriages being omitted and one wheel of the other carriage being broken away.

Figure 1:
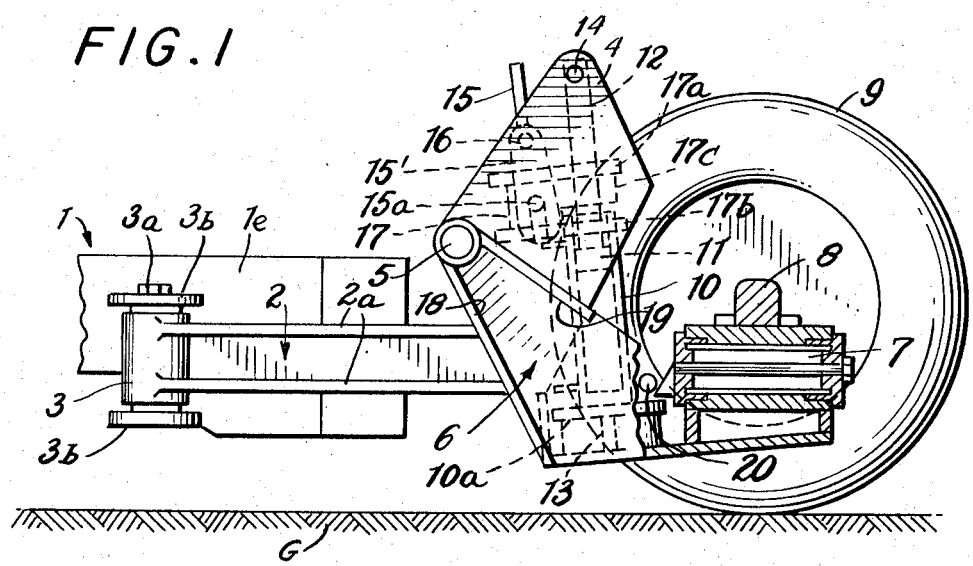
FIG. 1 is a side elevational view of the rear portion of a nonreversible low-bed full trailer and shows a two-wheeled carriage which is constructed in accordance with the present invention, the carriage being shown in operative position with certain of its parts broken away.

Referring to the drawings, and first to FIG. 6, there is shown a nonreversible low-bed full trailer including a chassis 1 forming a bed for the cargo, front wheels 1a on a front truck 1b which is turnably secured to the front portion 1c of the chassis 1 by a fifth wheel 1d, and two pairs of rear wheels 9 (only one shown), which are connected to the rear portion 1e of the chassis 1 in accordance with the present invention. The front truck 1b is provided with a lunette 1f which may be coupled to a towing vehicle, not shown.

Figure 3:
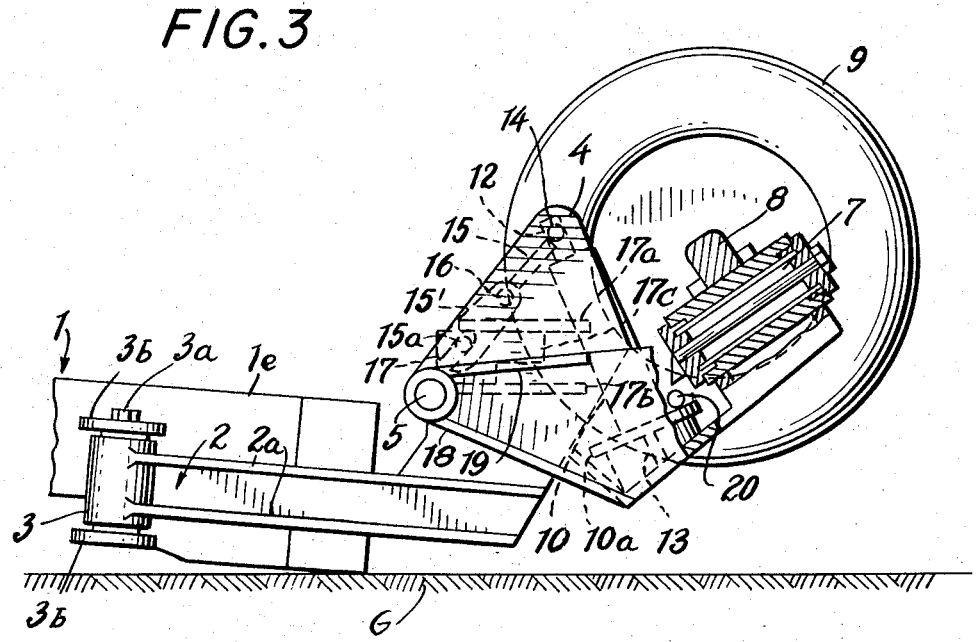
FIG. 3 is a view similar to that of FIG. 1 or 2 but showing the link in fully raised position in which the wheels are moved above the ground.
Figure 4:
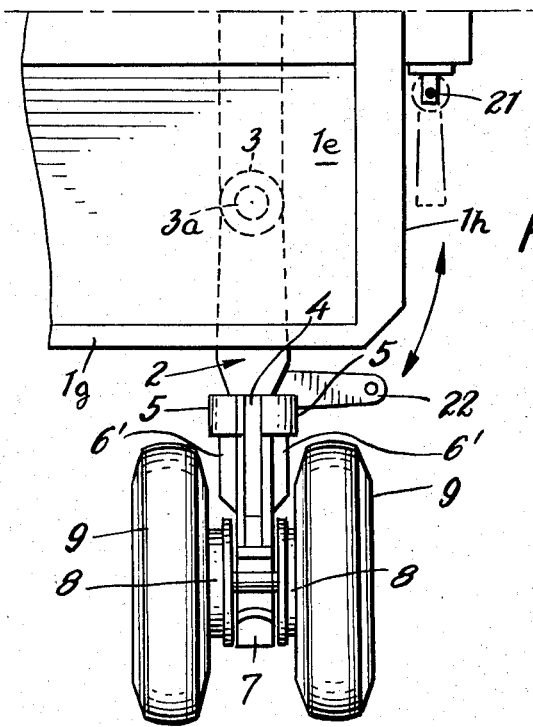
FIG. 4 illustrates the link in the raised position but with the carriage turned through about 90 degrees with reference to the position of FIG. 3.

FIG. 1 shows the rear portion 1e of the chassis 1 and particularly one of the two carriages which support the rear wheels 9 in such a way that the wheels may be lifted above the ground G whereby the trailing portion 1e descends into actual contact with the ground. In addition to the respective pair of rear wheels 9, each carriage comprises a substantially horizontal arm 2 whose front end portion is articulately connected to the rear portion 1e by a substantially vertical pivot 3a. This pivot is mounted in two vertically spaced brackets 3b and extends through an eye 3 at the front end of the arm 2. The rear end of the arm 2 comprises an upwardly projecting box-shape extension 4 which supports a substantially horizontal pivot 5 for the front end of a box-shaped link 6 whose rear end carries a self-aligning bearing 7 for the common shaft 8 of the respective rear wheels 9. As shown in FIG. 4, the pivot 3a is actually located beneath the rear portion 1e so that it is spaced from the lateral and rear edges 1g, 1h of the chassis 1. In the operative position of the arm 2 (see FIGS. 1 to 3 and 6), the respective pair of rear wheels 9 is located behind the rear portion 1e, i.e., this rear portion of the chassis 1 is then located intermediate the wheels 9 and the front portion 1c. In the inoperative position of the arm 2, the respective pair of rear wheels 9 is located laterally of the chassis 1, i.e., adjacent to a lateral edge 1g shown in FIG. 4.

Figure 2:
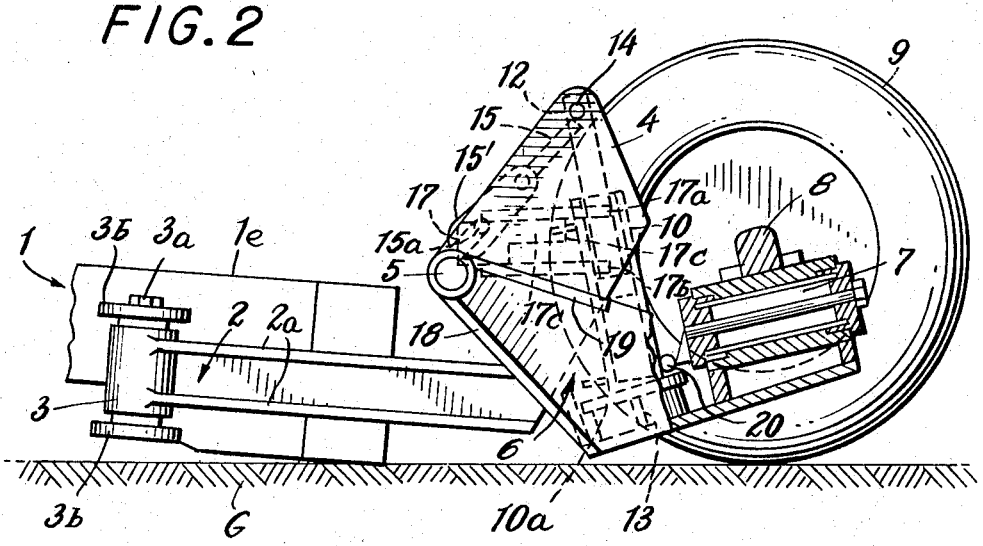
FIG. 2 illustrates the structure of FIG. 1 with the link of the carriage in partially raised position.

Each carriage is provided with an actuating device which preferably includes a double-acting hydraulic or pneumatic cylinder 10, a piston 11 which is reciprocable in the respective cylinder 10, and a piston rod 12 whose upper end is articulately connected with the topmost portion of the extension 4 by a horizontal pin 14. A projection in the form of a flange 10a at the lower end of cylinder 10 is secured to the lower part of the link 6 by an attaching device preferably including an elastic cushion 13 which is shown in FIGS. 1 to 3. The arm 2 is reinforced by horizontal stiffening ribs 2a, and the link 6 is provided with stiffening ribs 18 and 19, see particularly FIG. 4. As shown in FIG. 5, the link 6 is located intermediate the corresponding pair of wheels 9 on the respective carriage. If desired, the extension 4 may be manufactured as a separate part which is thereupon rigidly secured to the rear end of the arm 2, for example, by welding, by bolts and nuts, or in another suitable way.

Each carriage further supports a locking device which serves to releasably hold the respective link 6 in the position of FIG. 1 or 6 in which the rear wheels 9 are in contact with the ground G so as to maintain the chassis 1 in raised position in which the trailer is ready to be entrained by a towing vehicle. This locking device comprises a lever 15 which may be manipulated by hand and which is secured to the extension 4 of the arm 2 by a horizontal pin 16. The lower portion 15' of the lever 15 carries a pin 15a which is connected with a forked latch 17. The forked end portion 17c of the latch 17 may engage the upper end of cylinder 10 when the link 6 is in the position of FIG. 1 so that the piston rod 12 cannot be retracted into the cylinder. The link is then locked in the position of FIG. 1 and the cushion 13 will allow for some relative movement between the link and the arm 2. The latch 17 is slidable between upper and lower rails 17a, 17b and its forked end portion 17c straddles the piston rod 12 when the lever 15 is in the position of FIG. 1. When the lever 15 is pivoted to the position of FIG. 2, the forked end portion 17c is moved laterally and away from the piston rod 12 and cylinder 10 so that the cylinder may move upwardly toward and beyond the upper rail 17a.

Each link 6 is provided with a horizontal motion transmitting pin 20 which is located above the upper side of the corresponding flange 10a and is engaged by the flange when the cylinder 10 moves upward so that the pin 20 then causes the link to rotate about the axis of the pivot 5 and to move to the position of FIG. 3 in which the respective wheels 9 are lifted above the ground G so that the rear portion 1e of the carriage 1 may descend onto the ground.

The trailer further comprises a pair of coupling devices one of which is shown in FIG. 4 and serves to detachably hold the respective arm 2 in the operative position of FIGS. 1 to 3 and 6. This coupling device comprises two aperture coupling elements 21, 22 one of which is mounted on the rear portion 1e and the other of which is mounted on the arm 2. When the arm 2 is caused to swivel in a counter-clockwise direction, as viewed in FIG. 4, so as to move from the inoperative position (laterally of the chassis) to the operative position of FIGS. 1 to 3 and 6, the coupling elements 21, 22 overlap and may be connected by a cotter pin, a bolt or the like, not shown. The coupling element 21 extends from the rear edge 1h of the chassis 1.

As mentioned above, the extension 4 is a substantially box-like structure which is receivable between two spaced vertical panels 6' of the link 6, see particularly FIG. 5, so that the actuating cylinder 10 is fully concealed by the extension 4 and is shielded from rain, snow or dust.

The other carriage for the second pair of rear wheels 9 is mounted in the same way as the carriage of FIGS. 1 to 6 and is mirror symmetrical with reference thereto. Thus, when the arms 2 are caused to swivel about the respective pins 3a into operative positions corresponding to the position of the arm 2 shown in FIG. 4, the rear wheels 9 are adjacent to the two lateral edges of the chassis 1 so that the rear edge 1h is unobstructed and the cargo may be loaded onto or unloaded from the bed over one or more suitable ramps 23 (see FIG. 1) which may be hinged to the rear portion 1e of the chassis.

The operation of the improved carriages will be described with reference to the carriage shown in FIGS. 1 to 4. When the trailer is ready to move, the carriage is in the position of FIG. 1 in which the piston 11 is close to the upper end of the cylinder 10 so that the forked end portion 17c of the latch 17 may engage the upper portion of the cylinder 10a to prevent pivoting of the link 4 in a counterclockwise direction. Consequently, the wheels 9 are in contact with the ground G and the rear portion 1e is raised above the ground so that the upper side of the chassis 1 is substantially horizontal. The arm 2 extends rearwardly and the coupling elements 21, 22 are connected to each other to hold the arm in such operative position. The lower chamber of the cylinder 10 (beneath the piston 11) is filled with a supply of entrapped pressure medium, preferably oil or another suitable hydraulic fluid. If the operator thereupon desires to lower the rear portion 1e in contact with the ground G, he separates the forked end portion 17c of the latch 17 from the cylinder 10 and opens the valve (not shown) which controls the outflow of pressure medium from the lower chamber of the cylinder so that the piston 11 descends toward the flange 10a and the weight of the rear portion 1e automatically causes the link 6 to pivot in counterclockwise direction toward the position of FIG. 2 in which the rear portion 1e contacts the ground G. The arm 2 remains above the ground so that it may be caused to swivel about the pin 3a as soon as the coupling elements 21, 22 are separated and as soon as the rear wheels 9 are lifted to the position of FIG. 3. Such lifting of the wheels 9 above the ground G is effected as follows: The operator opens a valve (not shown) which admits pressure medium into the upper chamber of the cylinder 10 (above the piston 11) so that the cylinder 10 is caused to move upwardly and its flange 10a engages the motion transmitting pin 20 which causes the link 4 to pivot in a counterclockwise direction and to lift the corresponding rear wheels 9. This will be readily understood with reference to FIG. 2 which shows that, once the rear portion 1e engages the ground G, the arm 2 cannot descend any further and, since the piston rod 12 is connected to the extension 4 which is rigid with the arm, admission of pressure medium into the upper chamber of the cylinder 10 automatically causes the cylinder to move upwardly and to lift the corresponding rear wheels 9. The operator is now in a position to swivel the entire carriage about the corresponding pin 3a and to move the arm 2 to the inoperative position of FIG. 4. Consequently, the rear edge 1h of the chassis is unobstructed and the ramp 23 may be lowered to facilitate loading or unloading of cargo.

The carriages may accommodate suitable pressure tanks or pumps which will generate the necessary pressure for admitting a fluid into the chambers of the cylinders 10. Such pumps may be driven by the engine of the towing vehicle. A single pump will suffice for both cylinders 10.

When the operator thereupon desires to return the carriages to the positions corresponding to that of the carriage which is shown in FIGS. 1 to 3 and 6, the aforedescribed procedure is reversed. Thus, each carriage is caused to swivel in a direction to move the corresponding pair of wheels 9 to the rear of the edge 1h so that the coupling elements 22 may be connected with the complementary elements 21 to insure that the arms 2 remain in operative positions. The operator then allows pressure medium to escape from the upper chambers of the cylinder 10 so that the weight of the links 6 and wheels 9 causes the links 6 to pivot about the pins 5 and to move to the positions corresponding to that shown in FIG. 2 in which the wheels 9 contact the ground G. In the next step, the operator admits pressure medium to the lower chambers of the cylinders 10 so that the cylinders move with reference to the pistons 11 and the rear portion 1e is raised above the ground G whereby the latches 17 may reengage the cylinders to prevent uncontrolled lowering of the chassis.

A very important advantage of the actuating devices is that the fluid in the cylinders 10 need not remain under pressure when the trailer is in motion. The locking devices then insure that the links 6 cannot pivot with reference to the arms 2. Consequently, the actuating devices are less prone to malfunction since they need not be in use excepting when the chassis is to be moved into the ground-contacting position of FIGS. 2 and 3 or into the raised position of FIGS. 1 and 6. When the chassis 1 is lowered, the pivots 5 descend together with the rear portion 1e but remain stationary when the wheels 9 are lifted away from the ground G. It will be noted that the pivots 5 are located sufficiently above the horizontal portions of the arms 2 to insure that the links 6 need not reach the ground G when the rear portion 1e descends. Each arm 2 actually resembles a bell crank lever.

In order to facilitate separation of cylinders 10 from the respective latches 17, the lower chambers of the cylinders 10 may receive some fluid before such fluid is allowed to escape from the lower chambers.

Figure 7:
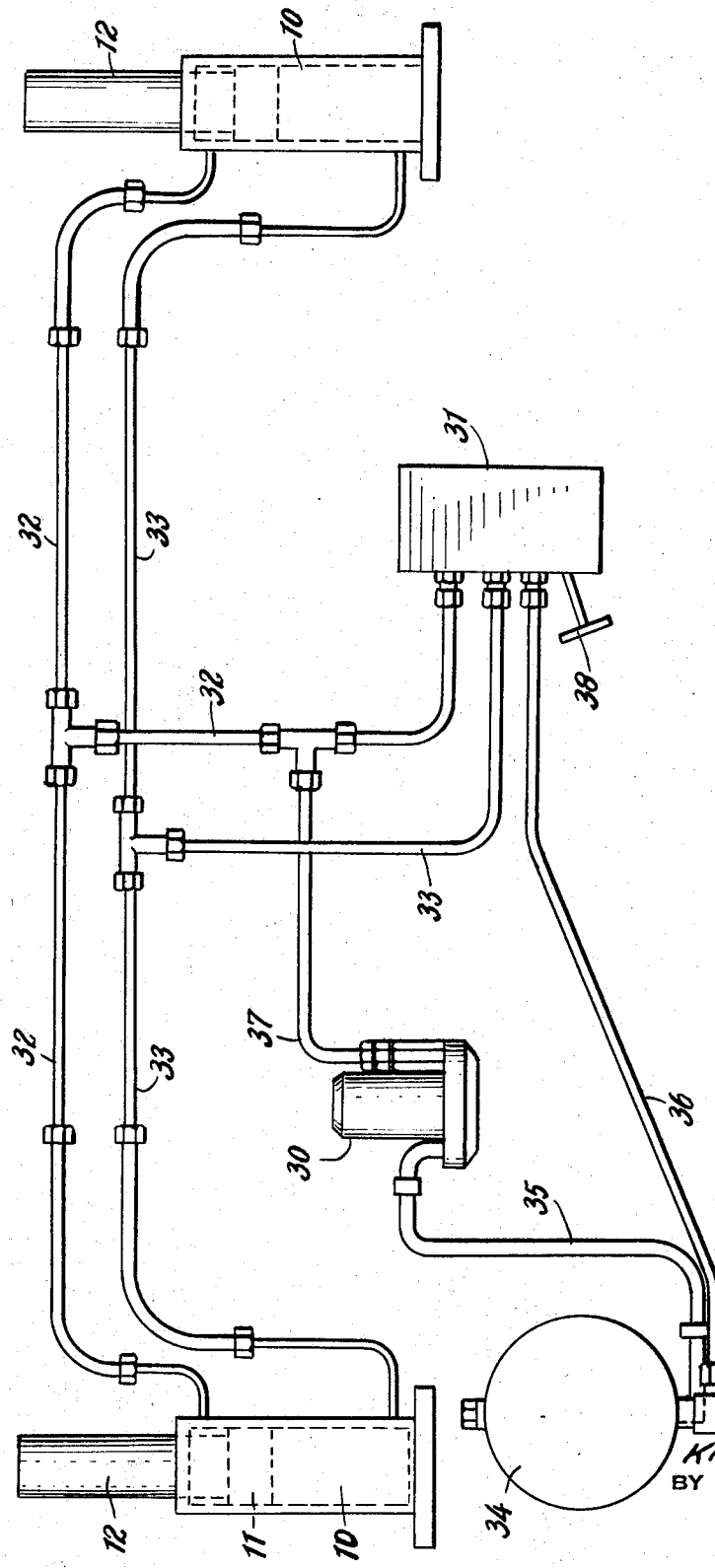
FIG. 7 shows the fluid-operated system for the invention.

One form of a fluid-operated system which serves to rock the links 6 about the pivots 5 is shown in FIG. 7. The system includes a pump 30 which is driven by an electric motor, not shown, a manually operated pump 31, first pressure conduits 32 connecting the pump 31 with the upper chambers of the cylinders 10, second pressure conduits 33 connecting the pump 31 with the lower chambers of the cylinders 10, an oil tank 34, a first suction conduit 35 connecting the tank 34 with the pump 30, a second suction conduit 36 connecting the tank 34 with the pump 31, a pressure line 37 which connects the pump 30 with the pressure conduits 32, and a hand wheel 38 which serves to control the valves in the pump 31.

The motor of the pump 30 receives current from a generator which is operated by the engine (not shown) of the towing vehicle. When the operator desires to expel the piston rods 12 from the respective cylinders 10, the motor of the pump 30 is started and this pump delivers oil from the tank 34 and through the conduits 35, 37. The hand wheel 38 is moved to a position in which the valves in the pump 31 allow oil to flow from the conduits 32 to the conduits 33. The oil acts against the upper sides and against the undersides of the pistons 11 whereby the piston rods 12 are expelled for reasons clearly apparent in FIG. 7.

When the piston rods 12 are to be retracted into the respective cylinders, the pump 30 is operated to deliver pressure medium into the conduits 32. The conduits 33 communicate with the conduit 36 via pump 31.

If the piston rods 12 are to be expelled by pump 31, the latter delivers pressure medium through the conduits 33. When the operator desires to retract the piston rods, the pump 31 delivers pressure medium through the conduits 32. Some of the pressure medium which flows from the lower cylinder chambers and through the conduits 33 will flow into the conduits 32. The remainder of such pressure medium is delivered through the conduit 36 and back to the tank 34.

Without further analysis, the foregoing will so fully reveal the gist of the present invention that others can, by applying current knowledge, readily adapt it for various applications without omitting features which fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In a trailer, in combination, a chassis having a front portion and a rear portion, said rear portion being movable between a ground-contacting position to facilitate loading or unloading of cargo and a raised position; a pair of carriages each including an arm articulately connected with said rear portion so as to swivel about a substantially vertical axis and being spaced from the ground in either position of said rear portion, a link, a rear wheel rotatably mounted on said link, and pivot means articulately connecting said link with the respective arm so that the link is pivotable about a substantially horizontal axis between a first position in which the respective rear wheel contacts the ground to raise said rear portion and a second position in which the respective rear wheel is raised above the ground to lower said rear portion onto the ground, each arm being movable between an operative position in which the respective rear wheel is located rearwardly of said rear portion and an inoperative position in which the respective rear wheel is laterally adjacent to said rear portion; a pair actuating means each operatively connected with one of said links and with the corresponding arm for moving the respective links between said first and second positions; locking means provided on each of said arms for detachably holding the respective links in said first positions; and a pair of coupling means for detachably connecting said arms to said chassis in the operative positions of said arms.

2. In a nonreversible low-bed full trailer, in combination, a chassis having a front portion and a rear portion, said rear portion being movable between a ground-contacting position to facilitate loading or unloading of cargo and a raised position; a pair of front wheels; a fifth wheel connecting said front wheels with said front portion; a pair of carriages each including an arm articulately connected with said rear portion so as to swivel about a substantially vertical axis and being spaced from the ground in either position of said rear portion, a link, a rear wheel rotatably mounted on said link, and pivot means articulately connecting said link with the respective arm so that the link is pivotable about a substantially horizontal axis between a first position in which the respective rear wheel contacts the ground to raise said rear portion and a second position in which the respective rear wheel is raised above the ground to lower said rear portion onto the ground, each arm being movable between an operative position in which the respective rear wheel is located rearwardly of said rear portion and an inoperative position in which the respective rear wheel is laterally adjacent to said rear portion; said rear wheels being adjacent to the opposite lateral sides of said rear portion when the corresponding arms are moved to said inoperative positions; a pair of actuating means each operatively connected with one of said links and with the corresponding arm for moving the respective links between said first and second positions; locking means provided on each of said arms for detachably holding the respective links in said first positions; and a pair of coupling means for detachably connecting said arms to said chassis in the operative positions of said arms.

3. In a trailer, in combination, a chassis having a front portion and a rear portion, one of said portions being movable between a ground-contacting position to facilitate loading or unloading of cargo and a raised position; a carriage including an arm member articulately connected with said one portion so as to swivel about a substantially vertical axis and being spaced from the ground in either position of said one portion, a link member, a wheel rotatably mounted on said link member, and pivot means articulately connecting said members so that the link member is pivotable about a substantially horizontal axis between a first position in which the wheel contacts the ground to raise said one portion and a second position in which the wheel is raised above the ground to lower said one portion onto the ground, said arm member being movable between an operative position in which said one portion is located intermediate said wheel and the other portion of said chassis and an inoperative position in which the wheel is laterally adjacent to said one portion; and actuating means for moving said link member between said first and second positions, said actuating means comprising a cylinder, a piston reciprocably received in said cylinder and having a rod articulately connected with said arm member, and attaching means including an elastic cushion connecting said cylinder with said link member.

4. In a trailer, in combination, a chassis having a front portion and a rear portion, one of said portions being movable between a ground-contacting position to facilitate loading or unloading of cargo and a raised position; a carriage including an arm articulately connected with said one portion so as to swivel about a substantially vertical axis and being spaced from the ground in either position of said one portion, said arm having an extension projecting upwardly therefrom and spaced from said vertical axis, a link, a self aligning bearing on said link, a pair of wheels having a common shaft rotatably mounted in said bearing, and pivot means articulately connecting said link with said extension so that the link is pivotable about a substantially horizontal axis between a first position in which the wheels are in contact with the ground to raise said one portion and a second position in which the wheels are raised above the ground to lower said one portion onto the ground, said arm being movable between an operative position in which said one portion is located intermediate said wheels and the other portion of said chassis and an inoperative position in which the wheels are laterally adjacent to said one portion; and actuating means operatively connected with said extension and with said link for moving the link between said first and second positions.

5. A structure as set forth in claim 4, further comprising locking means for detachably holding the link in said first position, said locking means comprising a lever pivotably secured to said extension and a latch connected with said lever and engaging said actuating means in the first position of said link.

6. A structure as set forth in claim 5, wherein said locking means further comprises a pin parallel with said pivot means and articulately connecting said lever to said extension, said actuating means comprising a cylinder supported by said link and a piston reciprocable in said cylinder and having a piston rod connected with said extension, said latch being arranged to engage said cylinder in the first position of said link so that the piston is held against movement with reference to the cylinder.

7. A structure as set forth in claim 6, further comprising attaching means including a resilient cushioning member connecting said cylinder with said link.

8. A structure as set forth in claim 7, wherein said cylinder comprises a projection and wherein said link comprises a motion transmitting member located in the path of said projection so as to be entrained by said cylinder when said actuating means is operated to retract said piston rod into said cylinder and to thereby move the link to said second position.

9. A structure as set forth in claim 4, further comprising coupling means for detachably holding the arm in said operative position, said coupling means comprising cooperating coupling elements respectively provided on said chassis and on said arm.

10. In a trailer, in combination, a chassis having a front portion and a rear portion, one of said portions being movable between a ground-contacting position to facilitate loading or unloading of cargo and a raised position; a carriage including an arm member articulately connected with said one portion so as to swivel about a substantially vertical axis and being spaced from the ground in either position of said one portion, a link member, a wheel rotatably mounted on said link member, and pivot means articulately connecting said members so that the link member is pivotable about a substantially horizontal axis between a first position in which the wheel contacts the ground to raise said one portion and a second position in which the wheel is raised above the ground to lower said one portion onto the ground, said arm member being movable between an operative position in which said one portion is located intermediate said wheel and the other portion of said chassis and an inoperative position in which the wheel is laterally adjacent to said one portion; and actuating means for moving said link member between said first and second positions, said actuating means comprising a cylinder element carried by one of said members, a piston reciprocably received in said cylinder element and having a rod element carried by the other member, the connection between said link member and the element carried thereby including an elastic cushion which allows for some displacement of said link member with reference to said arm member when the piston is held against movement in said cylinder element, a projection provided on said last named element, and motion transmitting means provided on said link member in the path of said projection to entrain the link member to said second position in response to retraction of said rod element into said cylinder element.

References Cited
UNITED STATES PATENTS

| | | | |
|---|---|---|---|
| 2,784,424 | 3/1957 | Southerland | 280—43.23 X |
| 2,788,908 | 4/1957 | Lynd | 280—43.23 X |
| 3,000,523 | 9/1961 | Nicolas | 214—505 |
| 3,215,296 | 11/1965 | Preston | 214—506 |
| 3,264,009 | 8/1966 | Langendorf | 280—81 |

GERALD M. FORLENZA *Primary Examiner.*

ALBERT J. MAKAY, *Examiner.*